(12) United States Patent
Doniec et al.

(10) Patent No.: US 9,031,413 B2
(45) Date of Patent: May 12, 2015

(54) UNDERWATER OPTICAL COMMUNICATION SYSTEM

(71) Applicant: Massachusetts Institute of Technology, Cambridge, MA (US)

(72) Inventors: Marek W. Doniec, Cambridge, MA (US); Daniela Rus, Weston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 133 days.

(21) Appl. No.: 13/938,291

(22) Filed: Jul. 10, 2013

(65) Prior Publication Data

US 2014/0212142 A1 Jul. 31, 2014

Related U.S. Application Data

(60) Provisional application No. 61/670,734, filed on Jul. 12, 2012.

(51) Int. Cl.
| | |
|---|---|
| *H04B 10/00* | (2013.01) |
| *H04B 10/80* | (2013.01) |
| *H04B 13/02* | (2006.01) |
| *H04L 7/00* | (2006.01) |

(52) U.S. Cl.
CPC ............... *H04B 10/80* (2013.01); *H04B 13/02* (2013.01); *H04L 7/0075* (2013.01)

(58) Field of Classification Search
USPC .......................................... 398/104, 105, 156
See application file for complete search history.

(56) References Cited

U.S. PATENT DOCUMENTS

| | | | | |
|---|---|---|---|---|
| 5,038,406 | A * | 8/1991 | Titterton et al. | 398/125 |
| 7,953,326 | B2 | 5/2011 | Farr et al. | |
| 8,750,727 | B1 * | 6/2014 | Hiller | 398/212 |
| 2005/0232638 | A1 * | 10/2005 | Fucile et al. | 398/140 |
| 2007/0183782 | A1 * | 8/2007 | Farr et al. | 398/104 |
| 2007/0242955 | A1 * | 10/2007 | Kavehrad | 398/130 |
| 2008/0205892 | A1 * | 8/2008 | Baiden | 398/104 |
| 2009/0274465 | A1 * | 11/2009 | Bandyopadhyay | 398/104 |
| 2012/0106978 | A1 * | 5/2012 | Jenson | 398/182 |
| 2014/0085613 | A1 * | 3/2014 | Doyle et al. | 353/69 |
| 2014/0212142 | A1 * | 7/2014 | Doniec et al. | 398/104 |

FOREIGN PATENT DOCUMENTS

CN 102098112 A 6/2011

OTHER PUBLICATIONS

International Search Report & Written Opinion in counterpart international patent application No. PCT/US13/49835, mailed on Apr. 17, 2014; 15 pages.

S.M. Navidpour, et al., "Mulitrate fractal free space optical communications using Fountain codes", Proceedings of SPIE, vol. 6012, Oct. 23, 2005, pp. 1-7.

* cited by examiner

*Primary Examiner* — Agustin Bello
(74) *Attorney, Agent, or Firm* — Schmeiser, Olsen & Watts LLP

(57) ABSTRACT

A method of optical underwater communications comprises applying a Fountain code to a plurality of data blocks. A sequence of optical data packets is transmitted through an underwater communications channel. Each optical data packet comprises one of the plurality of data blocks preceded by a preamble. The sequence of optical data packets transmitted through the underwater communication channel is received to generate a sequence of received data packets. The sequence of received data packets is sampled with the sampling clock to recover the plurality of data blocks.

20 Claims, 12 Drawing Sheets

UNDERWATER OPTICAL COMMUNICATION SYSTEM

CROSS-REFERENCE TO RELATED APPLICATIONS

This application is a utility application claiming priority to U.S. Provisional Application Ser. No. 61/670,734 filed on Jul. 12, 2012 entitled "UNDERWATER OPTICAL COMMUNICATIONS METHODS AND SYSTEMS," the entirety of which is incorporated by reference herein.

GOVERNMENT RIGHTS IN THE INVENTION

This invention was made with government support under Contract No. N00014-09-1-1031 awarded by the U.S. Navy and under Grant No. IIS1117178 awarded by the National Science Foundation. The government has certain rights in the invention.

FIELD OF THE INVENTION

The present invention relates generally to wireless communication. More specifically, the invention relates to underwater optical wireless communication to support high quality data transmission and object localization.

BACKGROUND

Approximately 70% of the Earth's surface is covered by water, yet much of the subsea world remains largely unexplored. Ocean observatories currently rely on the use of tethers or cables connected to ships on the surface of the water to transmit high bandwidth data. Such use of tethers restricts mobility and limits the ocean depths that can be explored due to limitations on the length of the tether. Acoustic communication enables wireless transmission of information underwater but is limited by low bandwidth and high latency due to the relatively low speed of sound underwater when compared to the speed of light, due to the relatively low frequency and bandwidth of acoustic waves when compared to electromagnetic waves, and due to acoustic noise in the ocean. Electromagnetic radiation is hindered due to the high absorption of electromagnetic waves across most of the electromagnetic spectrum.

The constraints of either tethered or acoustic communication are further exacerbated by the need to transmit high quality video over a significant distance for effective subsea exploration. For example, high quality video enables more reliable inspection of oil-rigs for mechanical failure. In addition to high bandwidth transmission, a need also exists for low latency transmission to enable teleoperation. In certain applications, low latency also enables haptic feedback for robotic control in harsh environments.

In an untethered environment, a need exists to collect data from a variety of sensors on the sea floor using an unmanned underwater vehicle (UUV). The UUV is required to locate sensors to position itself to reliably receive transmitted data from the sensors and to navigate between sensors. Accordingly, there is a need for a reliable, mobile, high bandwidth and low latency underwater optical communication system that can be used for wireless communication over a significant range.

BRIEF SUMMARY

In one aspect, the invention features a method of optical underwater communications comprises applying a Fountain code to a plurality of data blocks. A sequence of optical data packets is transmitted through an underwater communications channel. Each optical data packet comprises one of the plurality of data blocks preceded by a preamble. The sequence of optical data packets transmitted through the underwater communication channel is received to generate a sequence of received data packets. The sequence of received data packets is sampled with the sampling clock to recover the plurality of data blocks.

In another aspect, the invention features a method of data muling comprising determining a position of a transmit optical modem relative to a receive optical modem based on an intensity of an optical data packet transmitted by the transmit optical modem through an underwater communication channel and received by the receive optical modem. The position is modified until the intensity exceeds a threshold. A sequence of optical data packets is transmitted through an underwater communication channel. Each optical data packet comprises one of a plurality of data blocks preceded by a preamble, wherein the plurality of data blocks has a Fountain code applied thereto. The sequence of optical data packets transmitted through the underwater communication channel is received to generate a sequence of received data packets. A sample rate of a sample clock is synchronized to a data rate of at least one preamble in the sequence of received data packets. The sequence of received data packets is sampled with the sample clock to recover the plurality of data blocks.

In another aspect, the invention features an apparatus for optical underwater data transmission comprising a controller configured to receive a video image from a device interface. The controller is configured to partition the video image into a plurality of transmit data blocks by applying a Fountain code. The controller is configured to store the transmit data blocks in a transmit buffer. A Manchester encoder is in electrical communication with the transmit buffer. The Manchester encoder is configured to encode a bit stream of the transmit data block with a Manchester code. A preamble encoder is in electrical communication with the Manchester encoder. The preamble encoder is configured to prepend a Barker code to the transmit data block to form a transmit data packet. A light emitting diode (LED) driver is in electrical communication with at least one LED. The LED driver activates at least one LED based on a plurality of logic levels in the transmit data packet.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Embodiments of methods and systems described herein provide for high bandwidth and low latency transmission of data in a lossy underwater environment. In one example, high quality video is supported with 98 percent success at ranges within 25 yards, and with acceptable quality up to 40 yards. In another example communication latencies of 100 ms are achieved, thus enabling teleoperation between mobile UUVs and a plurality of sensors. Embodiments described herein employ a two-layer digital encoding scheme designed for error-resistant communication through a unidirectional channel for an efficient communication infrastructure. In other embodiments, bidirectional communication between a UUV and a sensor enables adaptive control of the transmission properties (e.g. packet size) to optimize transmission latency and frame success rate (e.g. a measure of reliability).

Figure 1A:
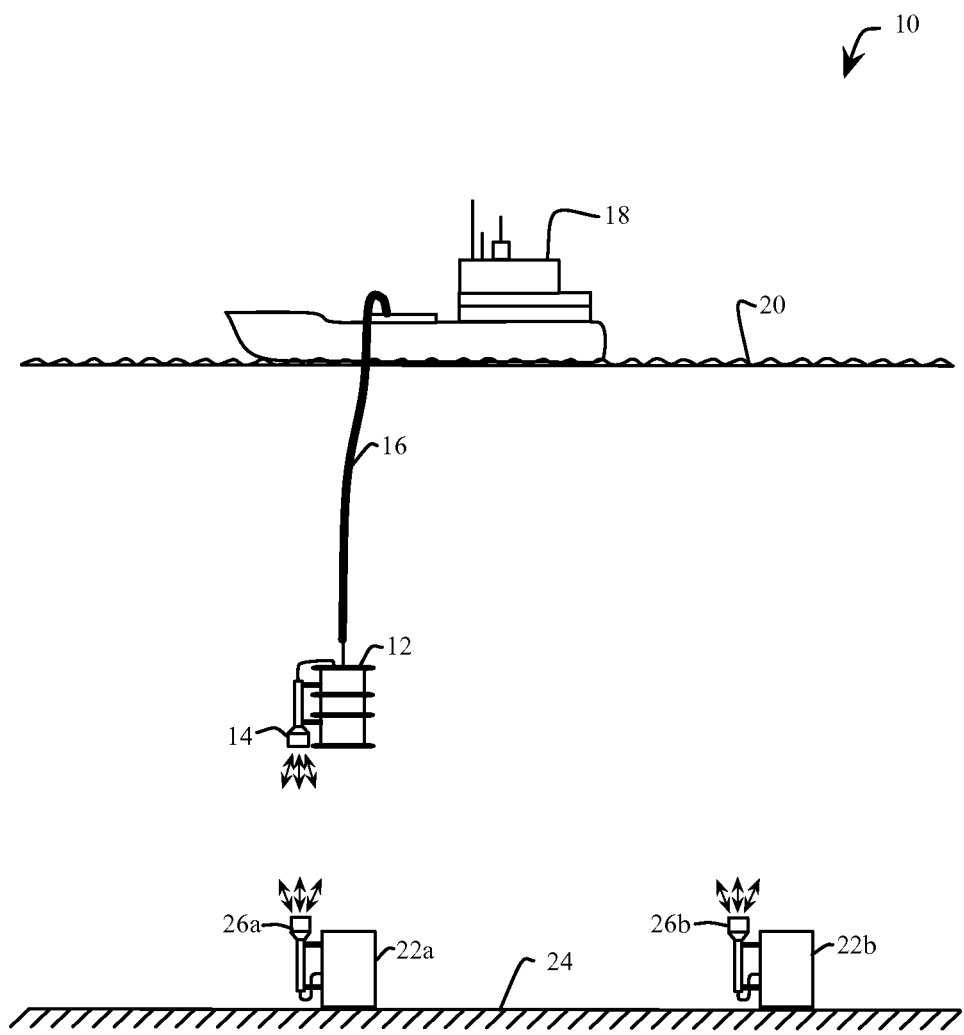
FIG. 1A is an elevation view of an embodiment of an underwater optical communication system with a tethered optical receiver.

FIG. 1A illustrates an embodiment of an underwater optical communication system 10 with a tethered optical receiver 12. The optical receiver 12 includes an optical modem 14 and is connected with a tether 16 to a vessel 18 on the surface 20 of a body of water. In one example, the tether 16 is a cable coupled with high bandwidth optical fiber. In another embodiment, the tether 16 includes insulated wiring. In one example, the optical receiver 12 is used to collect data from several sensors 22a and 22b located on the floor 24 of the body of water (e.g. a seabed) or in proximity to an object to be monitored. In one example, the sensors 22a and 22b are proximately located to an oil rig and are used to monitor the integrity of the pipes used to transport the oil. Other illustrative examples include underwater resource gathering, monitoring of mines, hydrolic fracturing sites, pipelines, corral reefs, harbor and waterway safety sites. Non-limiting examples of sensors include video cameras, thermal sensors, and vibration sensors. Sensors 22a and 22b have optical modems 26a and 26b respectively.

With reference to FIG. 1A the optical modem 14 of the optical receiver 12 is substantially aligned to the optical modem 26a of sensor 22a, thus enabling communication between the receiver 12 and the sensor 22a. Following data transfer between the optical receiver 12 and the sensor 22a, the vessel 18 moves the optical receiver 12 towards the sensor 22b to enable data transfer from the sensor 22b. Although the optical receiver 12 and sensors 22a and 22b are each shown with one optical modem, other embodiments include a pair of modems, one for transmitting optical data and one for receiving optical data. Each optical modem 14, 22a and 22b preferentially has a beam width of approximately +/−30 degrees without the need for collimation to improve optical signal strength or diffusion to improve location of the sensors 22a and 22b. The optical receiver 12 performs a Data MULE function (e.g. a Mobile Ubiquitous LAN Extension), but allowing the sensors 22a and 22b to remain in a harsh environment while data is collected remotely with the optical receiver 12.

Figure 1B:
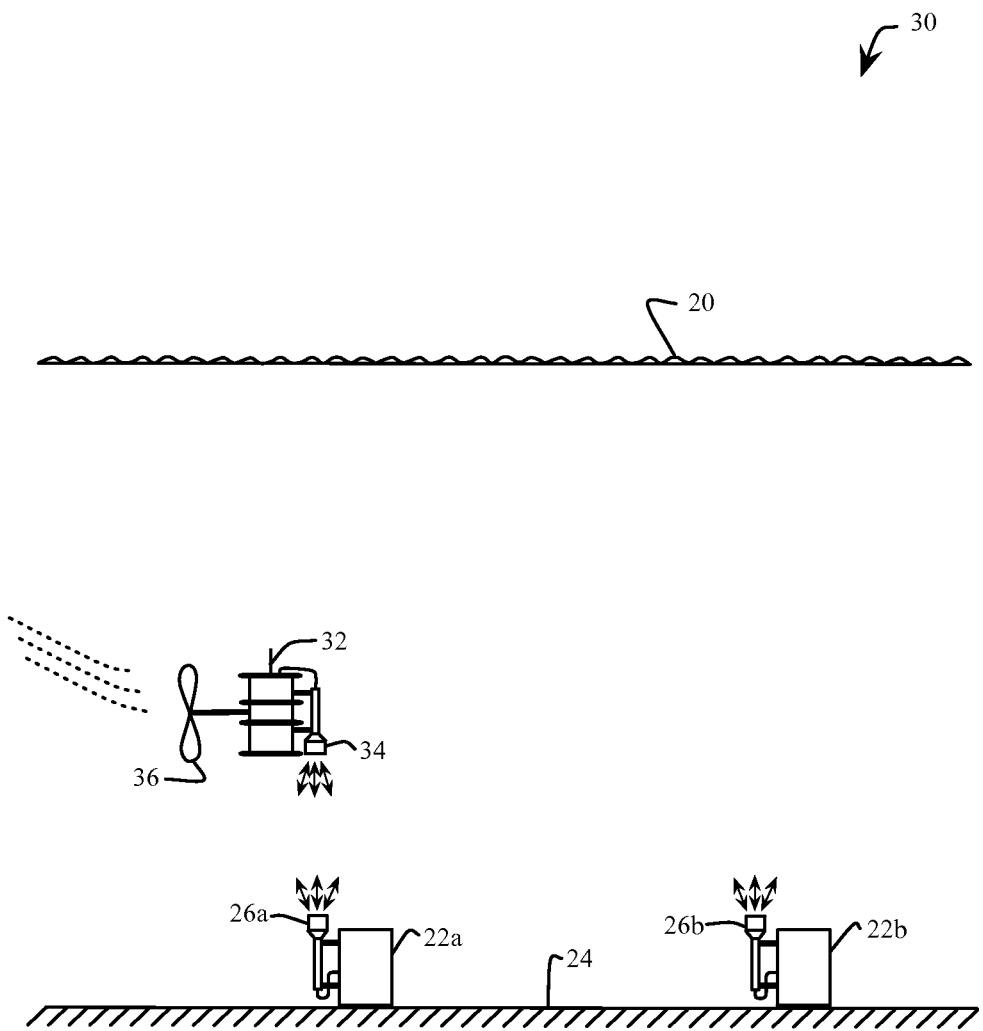
FIG. 1B is an elevation view of an embodiment of an underwater optical communication system with a mobile optical receiver.

FIG. 1B is another embodiment of an underwater optical communication system 30 with optical data received by a UUV 32 to remove the constraints of a tether. The UUV 32 includes an optical modem 34 that can be positioned in the line of sight of the optical modem 26a on sensor 22a by propelling the UUV 32 with a propeller 36 or similar transportation means. After data is collected from sensor 22a, the UUV 32 is positioned in the line of sight of sensor 22b to enable further data collection. The data collected by the UUV 32 is then optically transferred to another device or retrieved from the UUV 32 by transporting the UUV 32 to the surface 20.

Figure 1C:
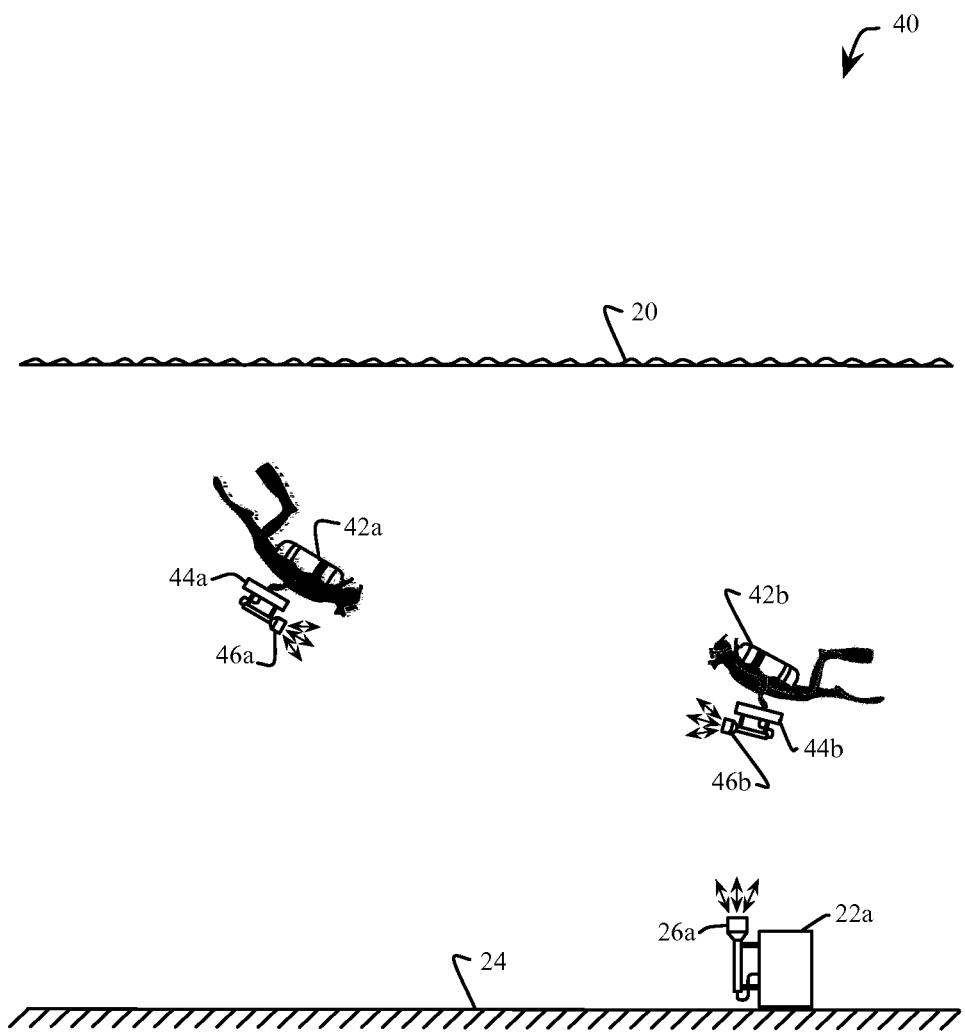
FIG. 1C is an elevation view of an embodiment of an underwater optical communication system used with divers.

FIG. 1C illustrates another embodiment of an underwater optical communication system 40 with SCUBA divers 42a and 42b. SCUBA diver 42a carries an optical transceiver 44a with a pair of modems 46a. Similarly, SCUBA diver 42b carries an optical transceiver 44b with a pair of modems 46b. The SCUBA divers 42a and 42b communicate with each other by pointing their respective modems at each other, thus enabling a high quality communication channel. For example, SCUBA diver 42b can collect data from the sensor 22a and then transfer the data to SCUBA diver 42a. Various data muling scenarios are contemplated within the scope of this disclosure using combinations of SCUBA divers, robotic UUVs, tethered optical receivers and sensors.

Figure 2A:
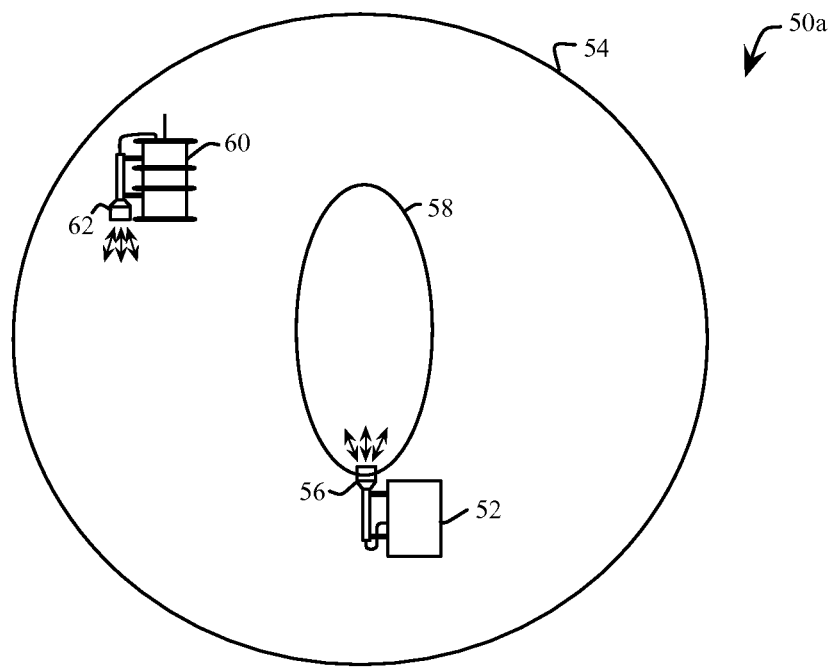
FIG. 2A is a schematic view illustrating localization of an optical transmitter using acoustics.
Figure 2B:
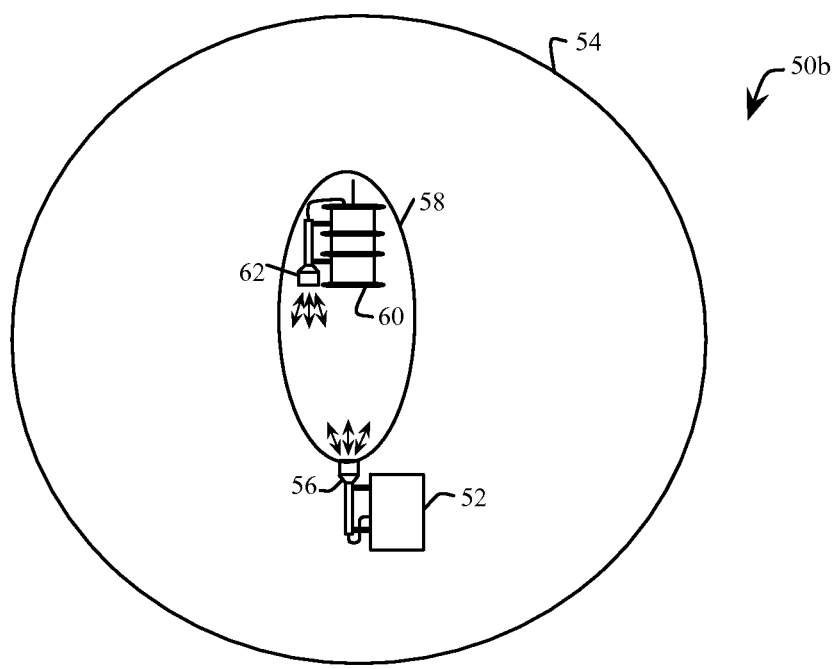
FIG. 2B is a schematic view illustrating localization of an optical transmitter using optics.

The various embodiments of underwater optical communication systems shown in FIG. 1A, FIG. 1B and FIG. 1C require a means for positioning an optical receiver in the line of sight of a sensor or an optical transmitter. This issue is particularly acute when the relative locations of the sensors are unknown or are when the distance between the sensors is large. FIG. 2A and FIG. 2B illustrate an acousto-optical communication network capable of large-scale data recovery that does not require precise location of the robotic UUVs or sensors. Instead, the UUVs use acoustic communication and ranging to position the UUV to be within line of sight of the sensor, thereby allowing the use of a high bandwidth and low latency optical channel to transfer data. With reference to FIG. 2A, a sensor 52 transmits an audio beacon with a usable audio range 54. The sensor 52 also has an optical modem 56 with a usable optical range 58. The optical receiver 60 has an optical modem 62 capable of receiving optical data and is further capable of receiving audio signals within the bandwidth of the audio beacon. In a preferred embodiment, the audio beacon uses Orthogonal Frequency Division Multiplexing and a carrier frequency of 27 Hz. Other carrier frequencies and transmission protocols are envisioned based on the absorption characteristics of the transmission medium (e.g. salt water or fresh water).

As illustrated in FIG. 2A, the optical receiver receives the audio beacon from the sensor 52 and navigates towards the sensor based on the signal strength of the audio beacon. In a preferred embodiment, the optical receiver 60 uses an Acoustic Stochastic Gradient Descent (ASGD) function to move closer to the sensor 52 until the optical receiver 60 is within the optical range 58 of the sensor 52.

The following is a non-limiting example of pseudocode used to implement the ASGD function. Where parameters are provided, they are ones that have been shown to work well in some simulations, but may vary with the application, and other combinations of parameters are envisioned.

```
1:  YAW_{ROBOT} ⇐ π * Random (−1.0 ... 1.0)
2:  SPEED_{ROBOT} ⇐ 0.25 Knots forward
3:  RANGE_{TH} ⇐ inf
4:  While (No optical link available) do:
5:      Receive RANGE_M
6:      If (RANGEM≥ RANGE_{TH}+ 1m) then:
7:          YAW_{ROBOT} ⇐ YAW_{ROBOT}+ π + π *
8:          Random(−0.5 ... 0.5)
9:          RANGE_{TH} ⇐ RANGE_M
10:     End if
11:     If (RANGE_M < RANGE_{TH}) then:
12:         RANGE_{TH} ⇐ RANGE_M
13:     End if
14: End while
15: Begin Optical Stochastic Gradient Descent
```

With reference to FIG. 2B, once the optical receiver 60 is within the optical range 58, the precise location of the optical modem 56 on the sensor 52 is determined based on the optical strength of the beam transmitted by the optical modem 56. In a preferred embodiment, when an optical connection is established between the optical receiver 60 and the sensor 52, the optical receiver 60 is positioned to optimized the optical strength of the beam by using an Optical Stochastic Gradient Descent (OSGD) function. If at any time, the optical connection between the optical receiver 60 and the sensor 52 is broken, the optical receiver 60 switches back to the ASGD function to reestablish an optical connection.

The following is a non-limiting example of pseudocode used to implement the Optical Stochastic Gradient Descent (OSGD) function. Where parameters are provided, they are ones that have been shown to work well in some simulations, but may vary with the application, and other combinations of parameters are envisioned.

```
1:  Retain YAW_{ROBOT} from ASGD function
2:  Retain SPEED_{ROBOT} from ASGD function
3:  SSI_{TH} ⇐ 0
4:  While (Optical Link Established) do:
5:      Wait 0.25 seconds, then measure SSI_M
6:      If SSI_M ≤ 0.9 * SSI_{TH} then:
7:          YAW_{ROBOT} ⇐ YAW_{ROBOT} + π + π *
8:          Random (−0.5 ... 0.5)
9:          SSI_{TH} ⇐ SSI_M
10:     End if
11:     If SSI_M > SSI_{TH} then:
12:         SSI_{TH} ⇐ SSI_M
13:     end if
14: End while
15: Switch back to ASGD
```

In another embodiment, the ranging and localization techniques illustrated in FIG. 2A and FIG. 2B are supplemented by using triangulation techniques, applicable to systems with more than one sensor (e.g. as shown in FIG. 1A and FIG. 1B). For example, with reference to FIG. 1B, FIG. 2A and FIG. 2B, the sensors 22a and 22b each have an optical range 58 and an audio range 54. When the audio range 54 of each sensor overlaps, coupled with information on the relative position of sensor 22a with respect to sensor 22b, triangulation techniques provide higher accuracy in determining how to position the UUV 32 to be within the optical range 58 of either sensor. Without the benefit of triangulation, the ranging and localization techniques illustrated in FIG. 2A and FIG. 2B are still enhanced by knowledge of the relative position of one sensor with respect to another sensor. In one embodiment, once optical data is collected from one sensor, the relative position of sensors is used to roughly relocate the optical receiver 60 towards the next sensor, even if the optical receiver 60 is not within the audio range 54 of the next sensor.

Preferentially, to save battery power in the sensor 52 when the optical receiver is not within the optical range of the sensor 52, the optical modem 56 is put into either a low power standby mode or optionally turned off with the acoustic link between the sensor 52 and the optical receiver 60. The optical modem 56 is then turned on by the acoustic link once the optical receiver 60 is within the optical range 58 of the sensor 52. Optionally, either or both of the acoustic and optical modems are turned off to save power and only turned on during pre-determined times during which the optical receiver is expected to be within range of the sensor 52.

Figure 3:
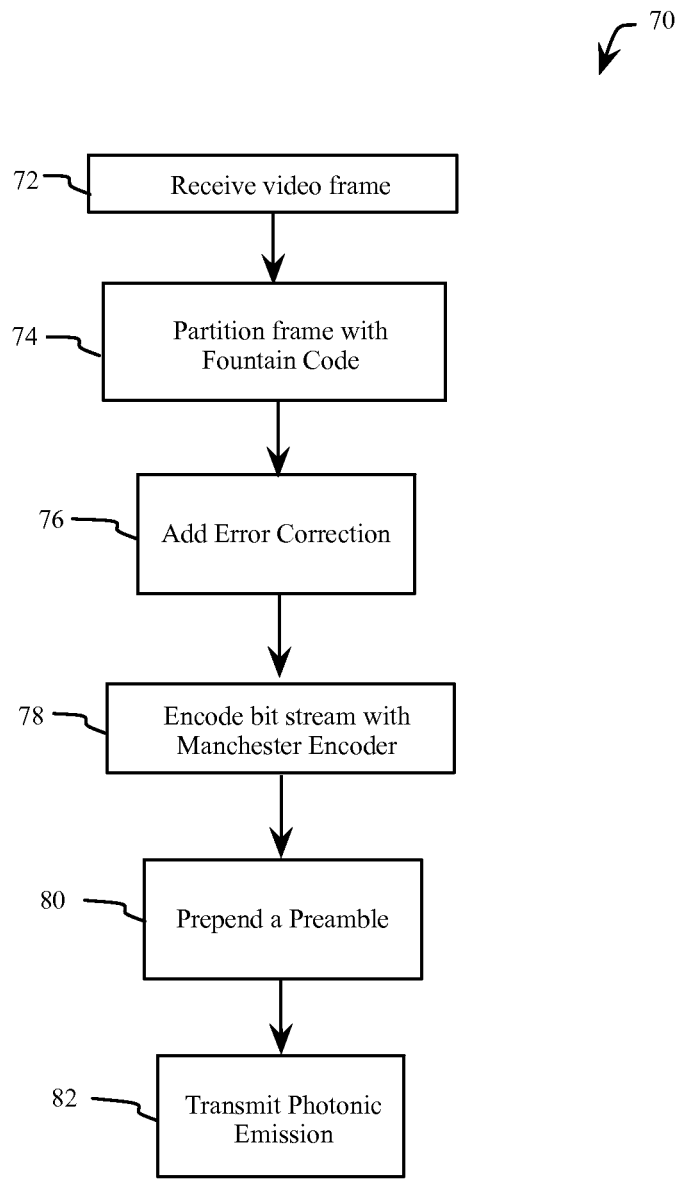
FIG. 3 is flowchart representation of optical transmission.

FIG. 3 illustrates the steps 70 performed to transmit data from an optical modem. In a preferred embodiment, the data to be transmitted is a high definition video frame received from a remote camera feed at step 72, although other sources of data are contemplated (e.g. data logs from a sensor). The video frame is preferentially encoded with Motion-JPEG (M-JPEG) to minimize overhead and to allow the received frame to be decoded immediately to minimize latency. The video frame is also partitioned into a series of data blocks and encoded with a Fountain Code at step 74, thereby improving transmission reliability. Oscillator stability also imposes a limit on the size of the data blocks because a stable oscillator is required to extract data when received by the optical receiver. In one embodiment, the oscillator stability limits the data block size to a few hundred bytes.

Fountain Codes are a class of codes designed for robust and scalable transmission through lossy mediums such as seawater. A Fountain Code generates a potentially limitless stream of output symbols. Examples of Fountain Codes include Random Linear Fountain, Raptor Code and a Luby Transform (LT) Code. A simplified explanation of the usage of the LT Code is to generate a random number between a range of numbers equal to the number of data blocks that the video frame is partitioned into. A number of data blocks equal to this random number are chosen at random and combined (for example with an XOR operation). The transmitted combination is then received and decoded with information about which blocks it was constructed from. In the present disclosure, the combined data blocks are also referred to as payload data.

Error correction is subsequently added to the payload data at step 76 to form a two layer encoding scheme for additional transmission reliability. In a preferred embodiment, the error correction code (ECC) includes a Cyclical Redundancy Code (CRC) and a Reed-Solomon (RS) Code, however other forms of ECC are also applicable depending on the preferred level of reliability and overhead. The payload data, ECC and information required for LT decoding are referred to in the present disclosure as a "Fragment." The information required for LT decoding includes a fragment ID, a video frame ID, and a video frame size.

The Fragment is further encoded at the bit stream level with a Manchester Encoder at step 78. A Manchester Encoder represents a logical "0" bit with a 01 sequence, and a logical "1" bit with a 10 sequence. In other embodiments, a different form of bit-level encoding is used for different light intensity levels. A preamble is subsequently added to the beginning of the Fragment at step 80 to form an optical data packet. In a preferred embodiment, the preamble is a Barker Code. The preamble is used by the optical receiver for packet detection and to synchronize the sample rate of the optical receiver to the data rate of the received optical data packet. The optical data packet is then transmitted by the optical modem at step 82 by photonic emission. Preferably, the transmission is accomplished by modulating an array of Light Emitting Diodes (LEDs).

In one preferred embodiment, the LED array is modulated to generate an analog optical waveform. Each LED in the array is controlled according to an On Off Key (OOK) modulation format. Furthermore, the number of LEDs active during a bit interval is varied so that the intensity of the generated optical waveform can be controlled to a resolution dependent on the number of LEDs in the array. Thus the bandwidth of the optical communications link is effectively increased for an optical communications link having a sufficiently high Signal to Noise Ratio (SNR).

In another embodiment, the LED array is operated by controlling the number of active LEDs during a bit interval and the optical intensity of each LED is also varied thus the granularity of the previous embodiment is improved. The optical intensity is controlled by modulating the drive current to each LED. The various embodiments described for the optical data transmission illustrated in FIG. 3 are unidirectional. No feedback, or handshaking, is required from the optical data receiver to the optical data transmitter thus further optimizing the transmission latency.

Figure 4:
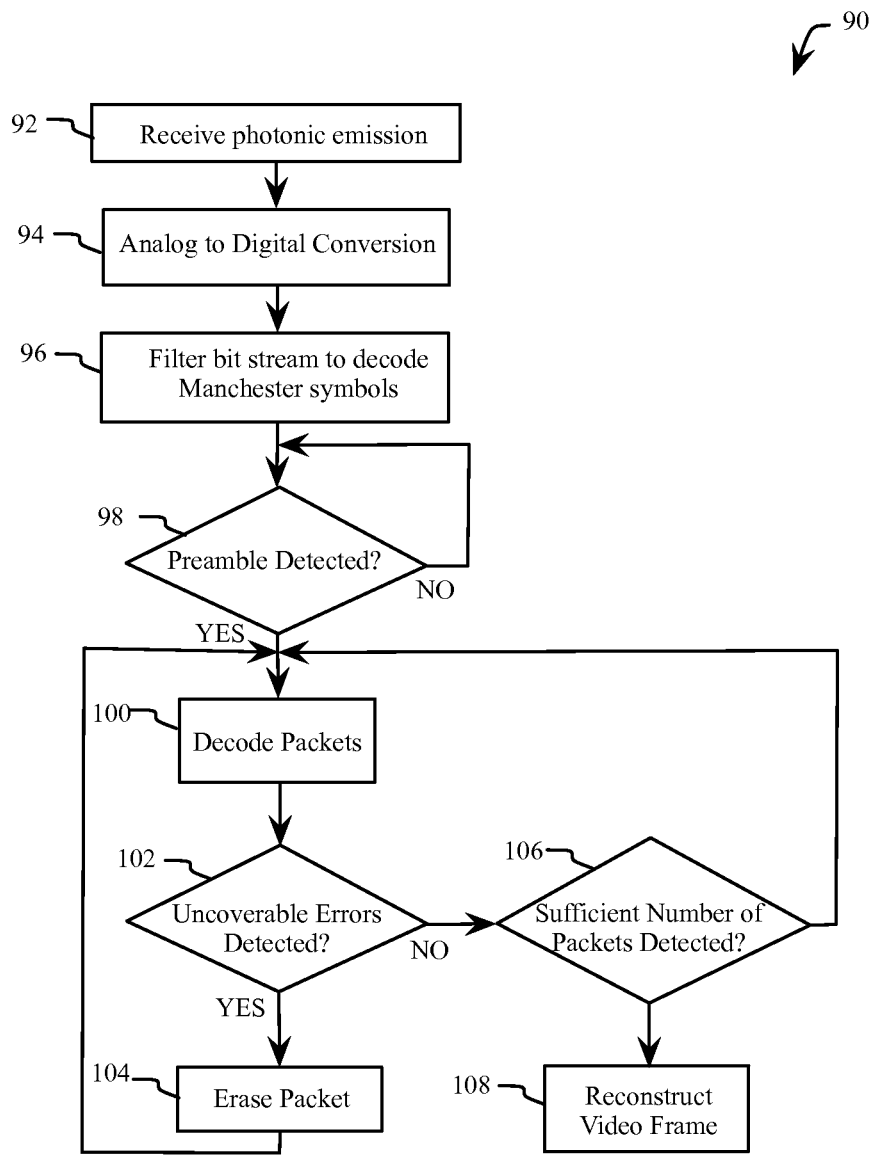
FIG. 4 is flowchart representation of optical reception.

FIG. 4 illustrates the steps 90 performed to receive data from an optical modem, for example, the data transmitted with the steps illustrated in FIG. 3. At step 92, a photonic emission is received, for example from an LED. At step 94, the received signal is converted from the analog domain to the digital domain. Optionally, the received signal is amplified prior to being converted to a digital signal. At step 96, the bit stream is filtered to decode the Manchester symbols. In one embodiment, the filtering of step 96 includes convolving a step function with the digitized bit stream. If a preamble is detected at step 98, (preferentially a Barker Code), then the optical data packet is sampled with a packet decoder, otherwise preamble detection continues until a preamble is found. The detected preamble is also used to synchronize a local sampling clock to the data rate of the preamble, so the subsequently decoded packet is sampled at the appropriate rate.

Packets are decoded at step 100 by decoding the Fragment with LT decoding information contained therein. The ECC associated with each optical data packet is evaluated at step 102 to determine if bit errors can be corrected. If a packet cannot be corrected, the entire packet is erased at step 104. If a sufficient number of packets have been received as determined at step 106, then the original video frame is reconstructed at step 108. Otherwise additional packets are decoded at step 100. The LT transform combined data blocks at random. It is not necessary for the data blocks or subsets of the original video frame to be received in order, only that each data block is received. Each optical data block transmitted by the optical transmitter has one or more data blocks and further identifies which data blocks (or temporal positions) within the original video frame are being transmitted.

With reference to FIG. 1A, FIG. 3 and FIG. 4, in one embodiment, the optical receiver 12 transmits a quality metric back to the sensor 22a. The quality metric is used by the sensor 22a to adjust a transmit characteristic between the sensor 22a and the optical receiver 12. For example, the quality metric is an error rate based on how often the CRC and RS Code corrects errant transmission of the data blocks, and the transmission characteristic is the size of the data blocks. If the transmission error rate is too high, the sensor 22a will reapply the LT Code and reduce the size of the data blocks. In another example, the quality metric is the error rate and the sensor 22a increases the number of bits used for the CRC and RS Code. Other combinations of quality metrics and transmission characteristics are envisioned within the scope of this disclosure, allowing for adaptive optimization of transmission bandwidth, latency and reliability. This example of adaptive optimization similarly applies to the embodiments shown in FIG. 1B and FIG. 1C.

Figure 5:
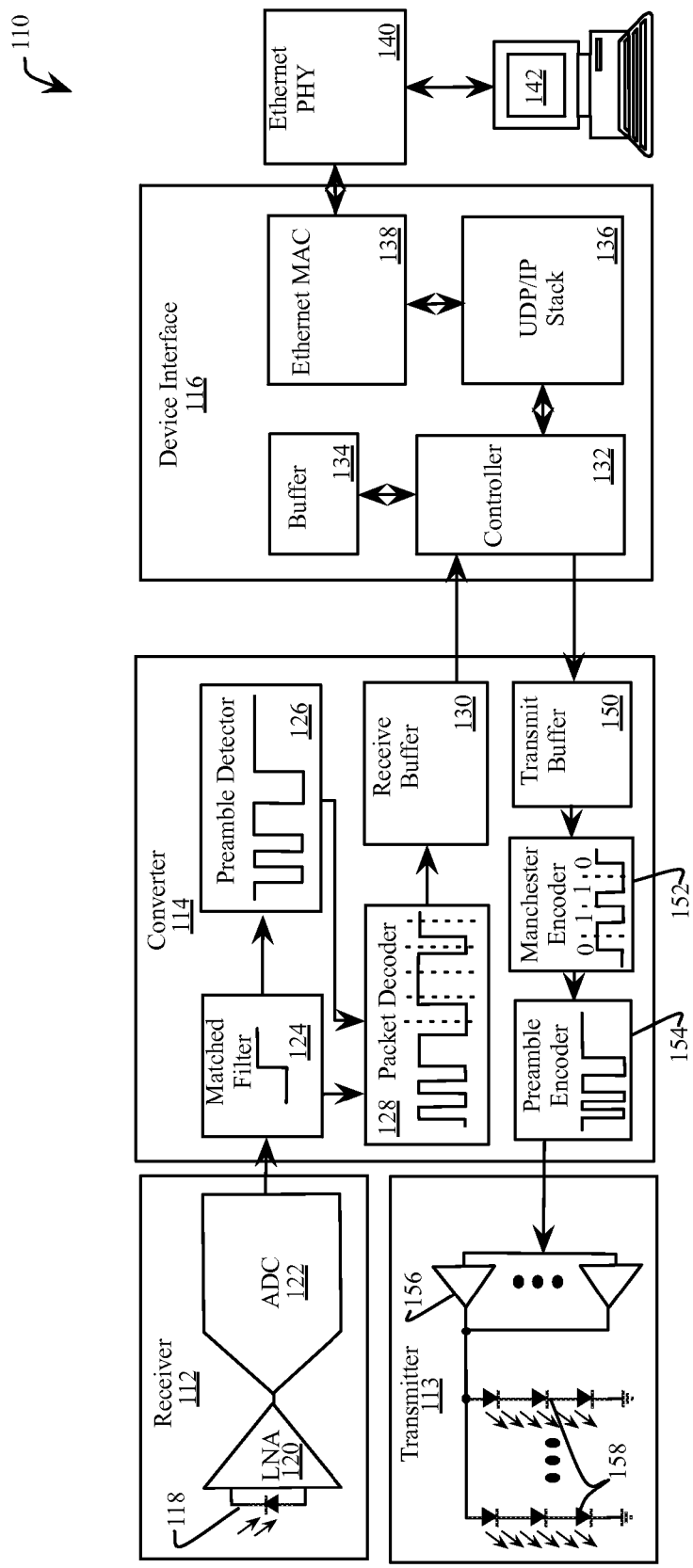
FIG. 5 is a block diagram of an optical transceiver according to an embodiment of the present invention.

FIG. 5 illustrates an embodiment of an optical underwater communication system 110 including both transmit and receive modems. The system 110 includes a Receiver 112, a Transmitter 113, a Converter 114 and a Device Interface 116. The Receiver 112 receives an optical signal with a detector 118, for example an Avalanche Photo Diode (APD), whose output is amplified by a Low Noise Amplifier (LNA) 120. The output of the LNA 120 is then converted to the digital domain with an ADC 122. In one example, the DC digitizes the output of the LNA 120 at a resolution of 12 bits and at 32 MHz. The output of the ADC 122 is then digitally convolved with a Matched Filter 124. For example, the Matched Filter 124 is a step function 8 samples wide to match a data rate of 4 MB/s. The Preamble Detector 126 detects the presence of a preamble, which triggers the Packet Decoder 128 to begin decoding using the same Matched Filter 124. For example, the Packet Decoder 128 samples every 8 samples once it has been triggered by the Preamble Detector 126. The Packets decoded by the Packet Decoder 128 are then stored in a Receive Buffer 130. In one example, the Receive Buffer 130 is 16K×8 bit.

The Convertor 114 is controlled by a controller 132. The Controller 132 includes a Buffer 134 for storing program code and data manipulation. In one example, the Buffer 134 is a 64 KB buffer. The Controller 132 reads the contents of the Receive Buffer 130, assembles a video frame from the received data and transfers the video frame to a UDP/IP Stack 136. The UDP/IP Stack 136 communicates with an Ethernet Media Access Control (MAC) link layer 138, which communicates with a Ethernet Physical layer (PHY) 140, which in turn communicates with a computer 142 or other display device. Similarly, video frames that are transmitted by the transmit modem are received by the computer 142 and transferred to the Transmit Buffer 150 by way of the Ethernet PHY 140, Ethernet MAC 138, UDP/IP Stack 136 and the Controller 132.

In one example, the Transmit Buffer 150 is 16K×1 bit. The Controller 132 implements the LT Coding of a video frame, adds ECC and information required for LT decoding. A Manchester Encoder 152 encodes a bit stream from the Transmit Buffer 150. The Preamble Encoder 154 prepends a preamble onto to encoded data from the Manchester Encoder 152 and outputs an assembled optical data packet to the Transmitter 113. The Transmitter 113 includes drivers 156 can convert logic levels into drive currents to drive an array of LEDs 158. In one embodiment, the drivers 156 also decode bits that determine an optical intensity to be transmitted. The optical intensity is controlled by varying the number of LEDs 158 that are driven. In another embodiment, the optical intensity is controlled by modulating the drive current from the drivers 156. In another embodiment, both the number of LEDs driven and the drive current from the drivers 156 are controlled.

Figure 6:
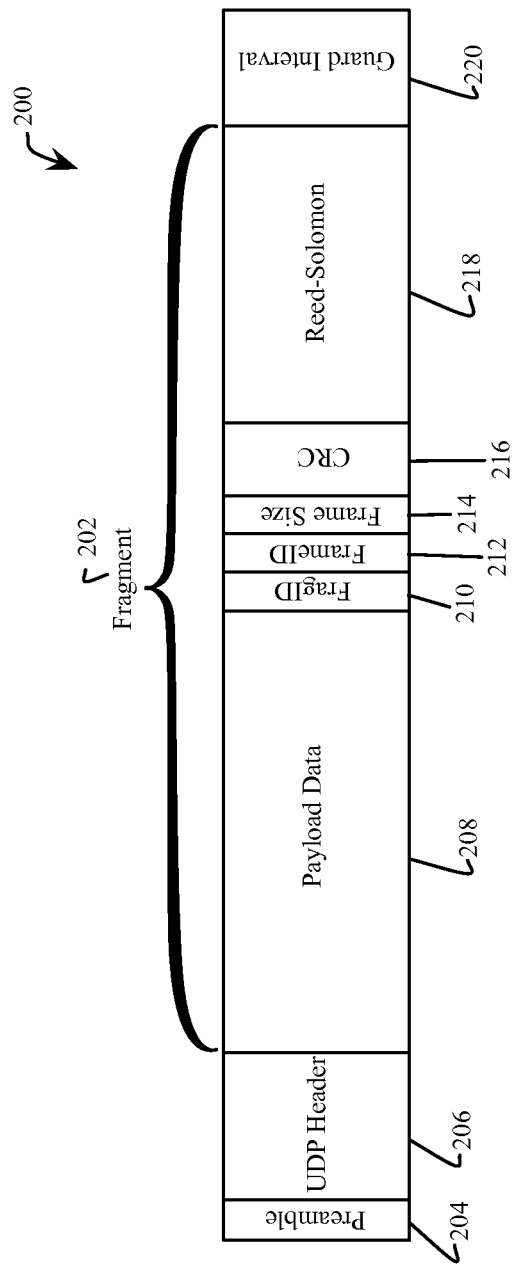
FIG. 6 is a block diagram of an optical packet according to an embodiment of the present invention.

FIG. 6 illustrates the structure of an optical data packet 200 transmitted by the steps shown in FIG. 3, according to a preferred embodiment. The optical data packet 200 includes a Preamble 204 used for packet detection and clock synchronization. The optical data packet 200 also includes a User Datagram Protocol (UDP) header 206. UDP is a network protocol useful for computer applications to send messages over a network without prior communications to set up special transmission channels. The optical data packet 200 further includes a Fragment 202, which includes Payload Data 208. The Payload Data includes one or more data blocks representing portions of a captured video frame in one example. In a preferred embodiment, the data blocks are chosen and combined with an LT code. In other embodiments, other fountain codes are used to chose and combine the data blocks. The Fragment 202 further includes identifying information to allow the received optical data packet to be associated with specific data blocks. Specifically, the identifying information includes a Fragment ID 210, a Frame ID 212, and a Frame Size 214. The Fragment 202 also includes ECC in the form of a CRC 216 and a Reed-Solomon code 218 used to help correct transmission errors. Optionally, the optical data packet 200 includes a Guard Interval 220 to ensure that packets do not overlap during reception by an optical receiver. In a preferred embodiment, the Preamble 204 is 2 Bytes, the UDP Header 206 is 8 Bytes, the Payload Data 208 is 229 Bytes, each of the Fragment ID 210, Frame ID 212 and Frame Size 214 are 2 Bytes, the CRC 216 is 4 Bytes, the RS Code 218 is 16 Bytes, the Guard Interval 220 is 6 Bytes and the Fragment 202 is 255 Bytes.

Figure 7:
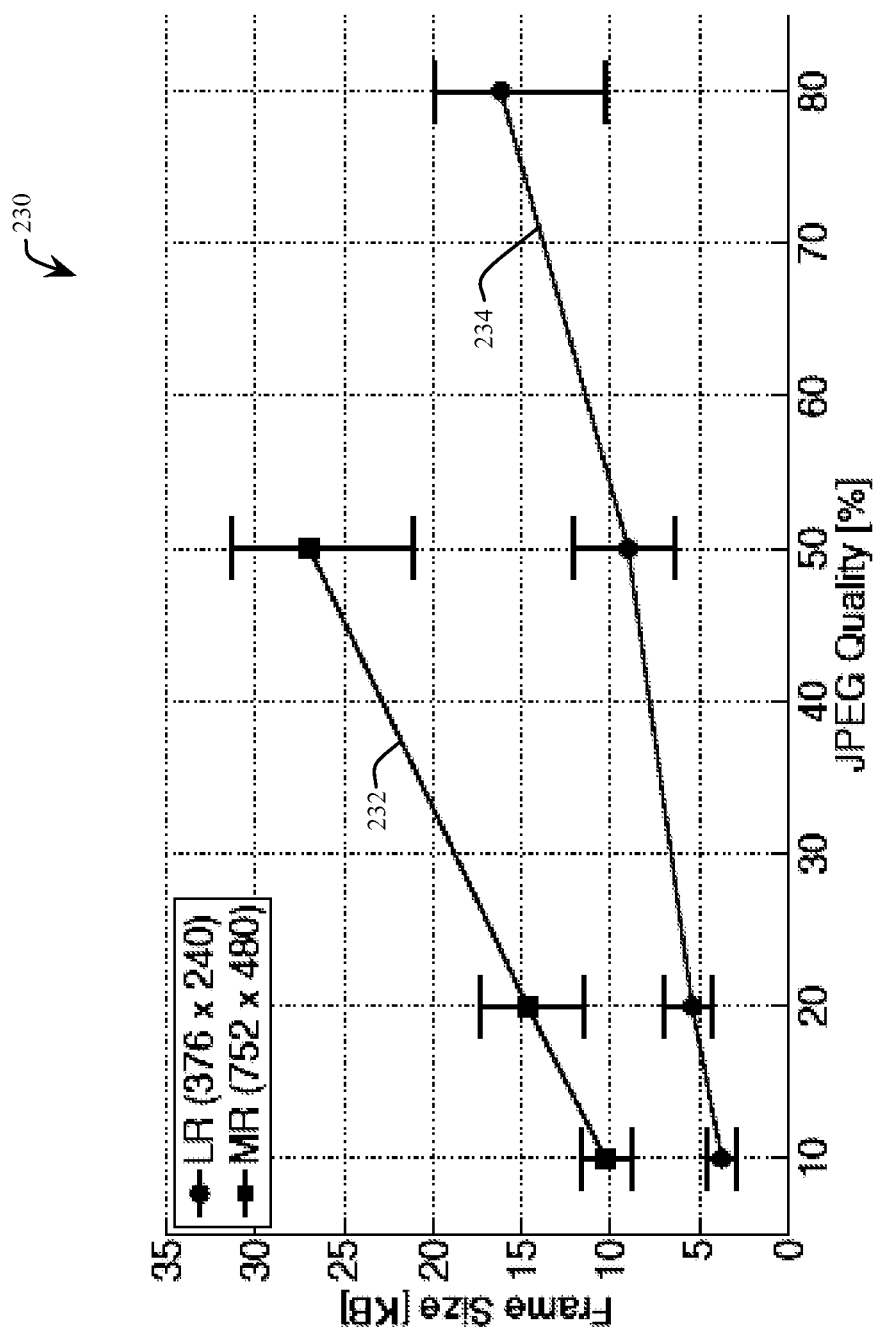
FIG. 7 is a graphical view illustrating the relationship of frame quality and frame size.

High definition underwater optical communication begins by partitioning a grabbed video frame into smaller packets. Smaller packets can be transmitted more reliably and with less latency but can increase the total time to transfer a video frame. FIG. 7, FIG. 8, FIG. 9 and FIG. 10 show successful test results using the communication system disclosed herein. FIG. 7 illustrates the relationship between frame quality and frame size. A low resolution video 232 with 376×240 pixels is compared against a high resolution video 234 with 752×480 pixels. High resolution or high M-JPEG quality necessitates larger frame sizes and thus larger packets. Accordingly, frame resolution can be traded for M-JPEG quality for a given frame size (e.g. transmission reliability).

Figure 8:
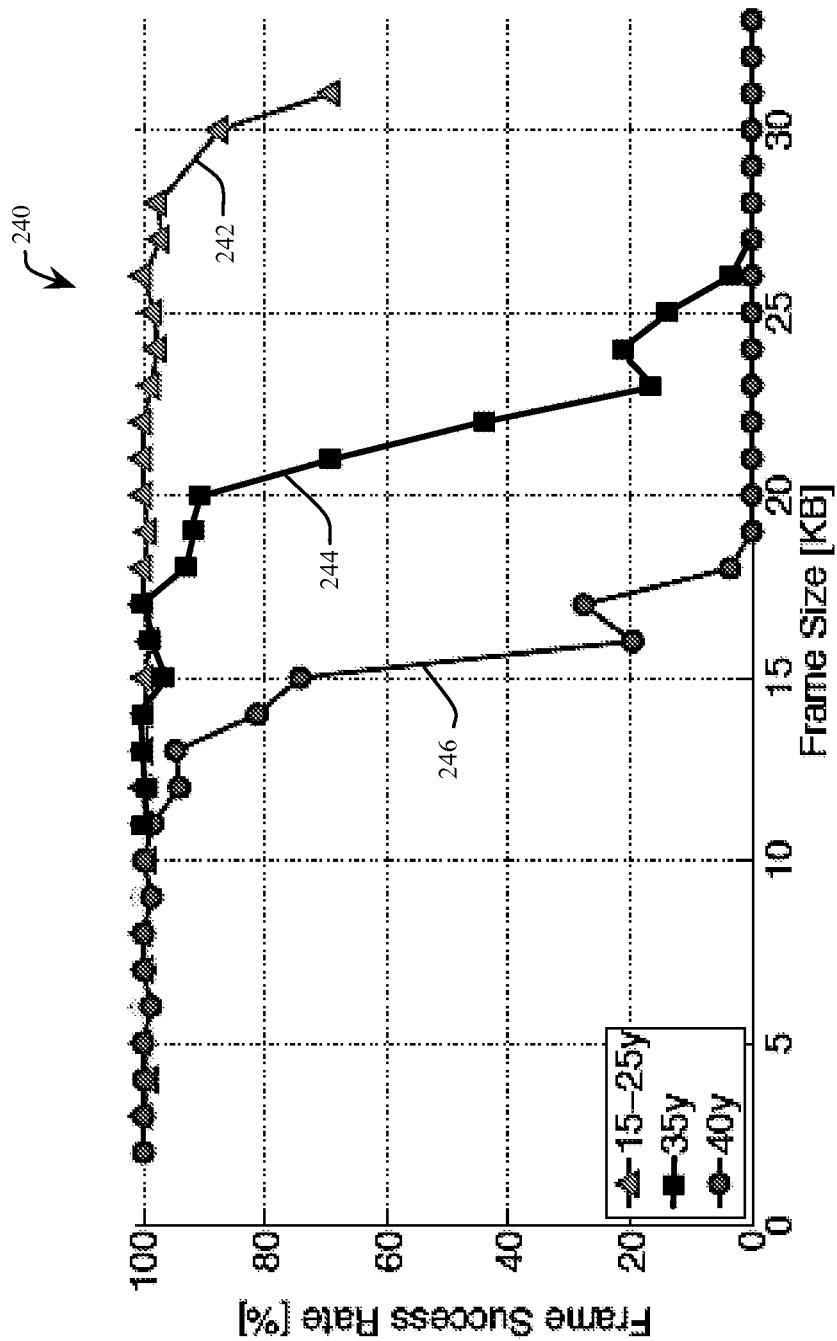
FIG. 8 is a graphical view illustrating the relationship of frame size and transmission success rate.
Figure 9:
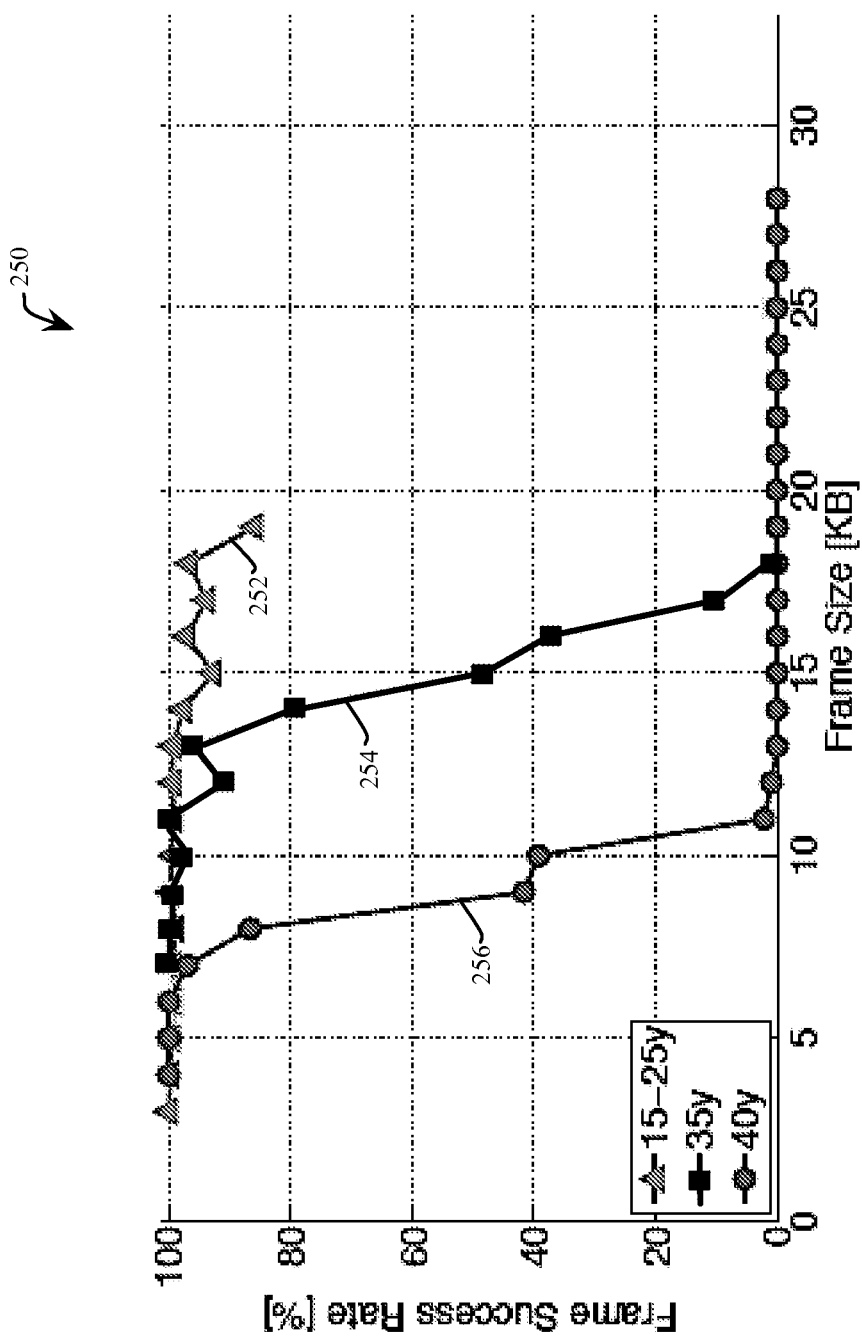
FIG. 9 is a graphical view illustrating the relationship of frame size and transmission success rate.
Figure 10:
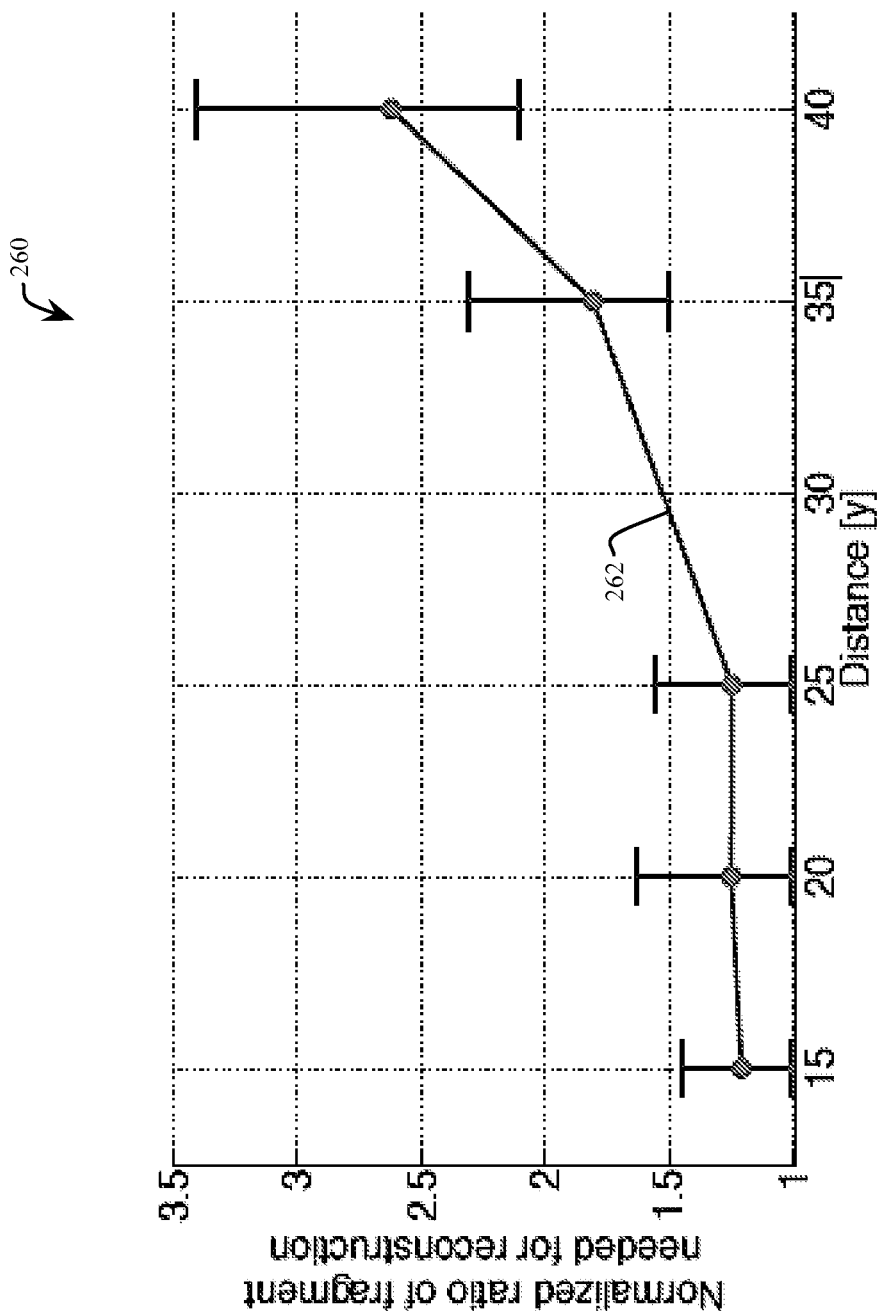
FIG. 10 is a graphical view illustrating the overhead required to reconstruct a fragment.

The rate of success of receiving M-JPEG frames is shown as a function of the distance between transmit and receive modems, frame size and frame rate with FIG. 8 and FIG. 9 corresponding to 10 frame per second (FPS) and 15 FPS respectively. With reference to FIG. 8, a modem distance of between 15 to 25 yards is shown as curve 242, a distance of 35 yards as curve 244 and a distance of between 40 yards as curve 246. For a required frame success rate (e.g. the rate of receiving optical data packets without error after applying ECC), shorter modem distances enable large frame sizes and thus packet sizes. With reference to FIG. 9, a modem distance of between 15 to 25 yards is shown as curve 252, a distance of 35 yards as curve 254 and a distance of 40 yards as curve 256. For a required frame success rate (e.g. the rate of receiving optical data packets without error after applying ECC), shorter modem distances enable large frame sizes and thus packet sizes. FIG. 10 illustrates the anticipated overhead 262 required to reconstruct a fragment as a function of distance considering a reasonable range of frame sizes.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of optical underwater communication comprising:
    applying a Fountain code to a plurality of data blocks;
    transmitting a sequence of optical data packets through an underwater communication channel, each optical data packet comprising one of the plurality of data blocks preceded by a preamble;
    receiving the sequence of optical data packets transmitted through the underwater communication channel to generate a sequence of received data packets;
    synchronizing a sample rate of a sampling clock to a data rate of at least one preamble in the sequence of received data packets; and
    sampling the sequence of received data packets with the sampling clock to recover the plurality of data blocks.

2. The method of claim 1 further comprising generating a video image from a number of received data packets, the number being less than a total number of optical data packets in the transmitted sequence of optical data packets, and wherein each of the number of received data packets represents different temporal portions of a video frame.

3. The method of claim 2 wherein at least two of the temporal portions of the video frame are not sequential in time.

4. The method of claim 1 wherein the Fountain code is a Luby Transform.

5. The method of claim 1 wherein each optical data packet further comprises a Read-Solomon code and a Cyclical Redundancy Code (CRC).

6. The method of claim 5 wherein at least one of the Read-Solomon code and the CRC cause erasure of the received data packet upon detection of an unrecoverable error.

7. The method of claim 1 wherein each of a plurality of bits in each of the plurality of data blocks is encoded with a Manchester Encoding.

8. The method of claim 1 wherein the preamble includes a Barker code.

9. The method of claim 1 further comprising activating, for each of the plurality of data blocks, a number of light emitting diodes (LEDs) in an array of LEDs in an underwater transmitter, the number of LEDs determined by a multi-bit value in each of the data blocks.

10. The method of claim 1 further comprising controlling an intensity, for each of the plurality of data blocks, a number of light emitting diodes (LEDs) in an array of LEDs in an underwater transmitter, the number of LEDs determined by a multi-bit value in each of the data blocks.

11. A method of data muling comprising:
    determining a position of a transmit optical modem relative to a receive optical modem based on an intensity of an optical data packet transmitted by the transmit optical modem through an underwater communication channel and received by the receive optical modem;
    modifying the position until the intensity exceeds a threshold;
    transmitting a sequence of optical data packets through an underwater communication channel, each optical data packet comprising one of a plurality of data blocks preceded by a preamble, wherein the plurality of data blocks has a Fountain code applied thereto;
    receiving the sequence of optical data packets transmitted through the underwater communication channel to generate a sequence of received data packets;
    synchronizing a sample rate of a sample clock to a data rate of at least one preamble in the sequence of received data packets; and
    sampling the sequence of received data packets with the sample clock to recover the plurality of data blocks.

12. The method of claim 11 further comprising determining the intensity of the optical data packet based on the preamble in the received data packet.

13. The method of claim 12 wherein the position is determined by an Optical Stochastic Gradient Descent algorithm.

14. The method of claim 11 further comprising determining a general location of the transmit optical modem before determining the position, the general location determined by receiving an acoustic beacon transmitted by the transmit optical modem, the general location positioning the receive optical modem sufficiently close to the receive optical modem to enable determining the intensity of the optical data packet.

15. The method of claim 14 wherein the general location is determined by an Acoustic Stochastic Gradient Descent algorithm.

16. The method of claim 11 wherein the position is maintained by maximizing the intensity.

17. The method of claim 11 wherein the receive optical modem is repositioned to a predicted location of a next transmit optical modem after the receive optical modem has received a number of received data packets.

18. The method of claim 11 further comprising transmitting, from the receive optical modem to the transmit optical modem, a quality metric based on a quality of a received data packet, and the transmit optical modem adjusting a transmit characteristic of the transmit optical modem to improve the quality of the received data packet.

19. The method of claim 11 wherein adjusting the transmit characteristic includes modifying a length of each of the plurality of data blocks.

20. An apparatus for optical underwater data transmission comprising:
- a controller configured to receive a video image from a device interface, the controller configured to partition the video image into a plurality of transmit data blocks by applying a Fountain code and the controller configured to store the transmit data blocks in a transmit buffer;
- a Manchester encoder in electrical communication with the transmit buffer, the Manchester encoder configured to encode a bit stream of the transmit data block with a Manchester code;
- a preamble encoder in electrical communication with the Manchester encoder, the preamble encoder configured to prepend a Barker code to the transmit data block to form a transmit data packet; and
- a light emitting diode (LED) driver in electrical communication with at least one LED, the LED driver activating at least one LED based on a plurality of logic levels in the transmit data packet.

* * * * *